United States Patent
Harper et al.

(10) Patent No.: US 11,837,263 B1
(45) Date of Patent: Dec. 5, 2023

(54) TAPE ERASE ELEMENT INCLUDED IN A TAPE ERASE DEVICE TO ERASE A TAPE MEDIUM

(71) Applicant: INTERNATIONAL BUSINESS MACHINES CORPORATION, Armonk, NY (US)

(72) Inventors: David Harper, Vail, AZ (US); Hugo E. Rothuizen, Oberrieden (CH); Mark Alfred Lantz, Adliswil (CH); Edwin Ralph Childers, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/820,731

(22) Filed: Aug. 18, 2022

(51) Int. Cl.
*G11B 5/024* (2006.01)
*G11B 5/008* (2006.01)
*G11B 5/325* (2006.01)

(52) U.S. Cl.
CPC .......... *G11B 5/024* (2013.01); *G11B 5/00813* (2013.01); *G11B 5/325* (2013.01)

(58) Field of Classification Search
None
See application file for complete search history.

(56) References Cited

U.S. PATENT DOCUMENTS

| | | | |
|---|---|---|---|
| 4,613,919 A | | 9/1986 | Miyatake et al. |
| 4,660,115 A | * | 4/1987 | Westfall ................. G11B 23/50 |
| 4,851,935 A | * | 7/1989 | Ohyama .................. G11B 5/02 |
| 4,858,051 A | * | 8/1989 | Fischer ............ G11B 23/08714 360/91 |
| 6,894,868 B2 | | 5/2005 | Onodera et al. |
| 7,835,108 B2 | | 11/2010 | Johnson et al. |
| 8,767,331 B2 | | 7/2014 | Wagner et al. |
| 10,475,472 B2 | | 11/2019 | Spiller |
| 2004/0051989 A1 | * | 3/2004 | Hasegawa ............ G11B 5/0245 360/66 |
| 2005/0168869 A1 | * | 8/2005 | Dugas ................ G11B 5/00813 |
| 2006/0146435 A1 | * | 7/2006 | Hasegawa ............ G11B 5/0245 360/66 |
| 2011/0043940 A1 | * | 2/2011 | Wagner ............ G11B 20/00086 |
| 2011/0051277 A1 | | 3/2011 | Bradshaw |
| 2013/0063836 A1 | * | 3/2013 | Bui ........................ G11B 5/584 |

OTHER PUBLICATIONS

P. Groel, "Erasing LTO Tapes", THIC Inc., Aug. 2007, pp. 30, [online]http://www.thic.org/pdf/August07/MEII_8-21-07.Groel.

* cited by examiner

*Primary Examiner* — Peter Vincent Agustin
(74) *Attorney, Agent, or Firm* — KONRAD RAYNES DAVDA & VICTOR LLP; David W. Victor

(57) ABSTRACT

Provided are a tape erase element, tape erase device, and method for forming a tape erase element to erase content of a tape medium. The tape erase element comprises a housing forming a gap extending along a length of an outer surface of the housing. The gap extends from the outer surface of the housing to open into an inner space formed within the housing. A magnet is positioned within the inner space of the housing and having a surface extending across the gap. The magnet produces a magnetic flux that extends through a tape contact zone extending across a portion of the outer surface of the housing and the gap to erase content on the tape medium as the tape guide rollers guide the tape medium across the housing through the tape contact zone.

20 Claims, 10 Drawing Sheets

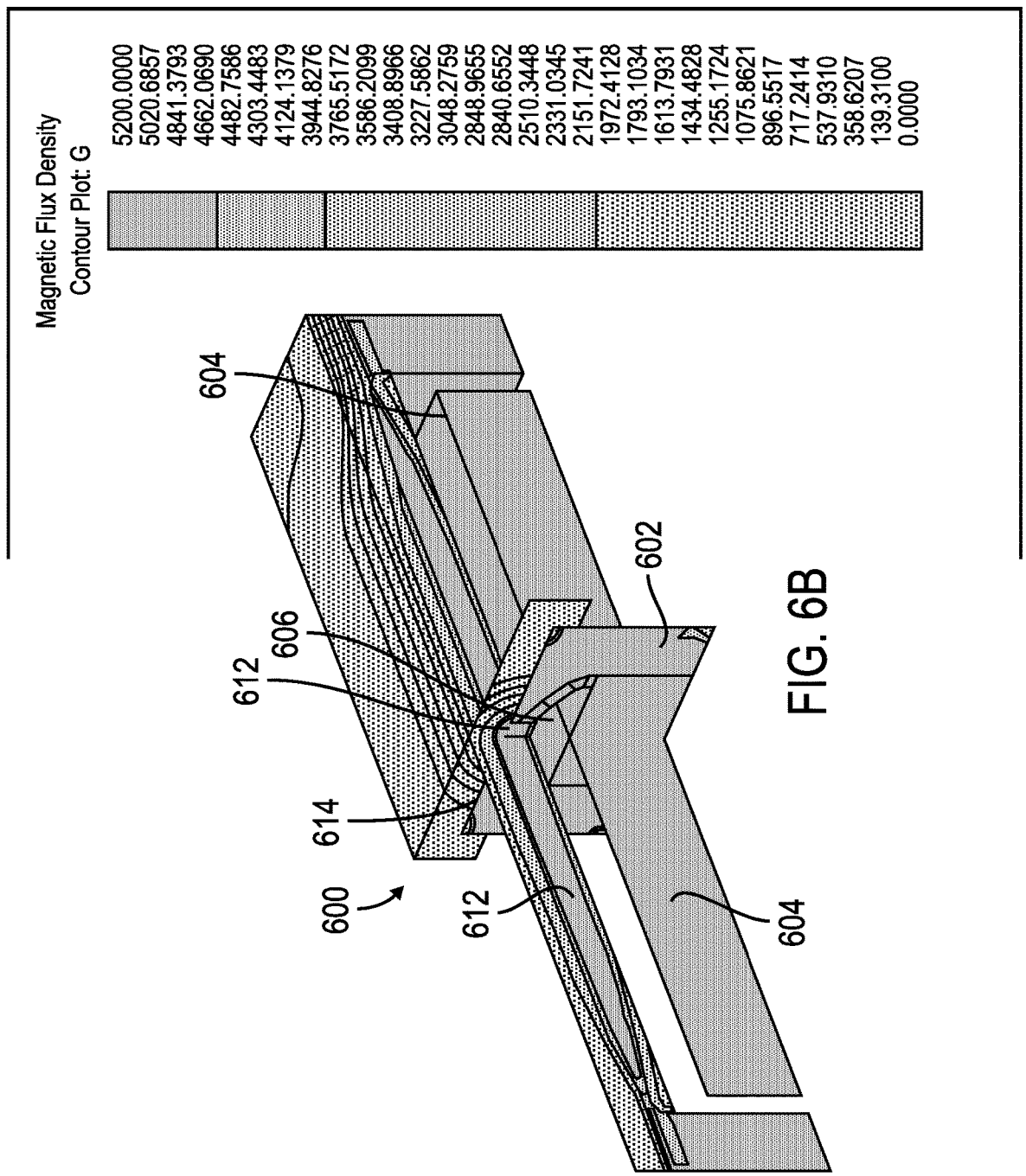

TAPE ERASE ELEMENT INCLUDED IN A TAPE ERASE DEVICE TO ERASE A TAPE MEDIUM

BACKGROUND OF THE INVENTION

1. Field of the Invention

Provided are a tape erase element, tape erase device, and method for forming a tape erase element to erase content of a tape medium.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media.

Data and servo patterns on a magnetic tape medium may be erased using a magnet. Some companies provide services to erase magnetic tape medium before disposal of the tape cartridge.

There is a need in the art for improved devices for erasing tape media.

SUMMARY

Provided are a tape erase element, tape erase device, and method for forming a tape erase element to erase content of a tape medium. The tape erase element comprises a housing forming a gap extending along a length of an outer surface of the housing. The gap extends from the outer surface of the housing to open into an inner space formed within the housing. A magnet is positioned within the inner space of the housing and having a surface extending across the gap. The magnet produces a magnetic flux that extends through a tape contact zone extending across a portion of the outer surface of the housing and the gap to erase content on the tape medium as the tape guide rollers guide the tape medium across the housing through the tape contact zone.

BRIEF DESCRIPTION OF THE DRAWINGS

FIG. 6b illustrates a cross sectional front side perspective view taken along the length of the tape erase element of FIG. 4C with a contour map of the magnetic flux density produced by the tape erase element.

DETAILED DESCRIPTION

Described embodiments provide an improved tape erase device to erase tape medium in a tape cartridge. Described embodiments provide an improved structure for a tape erase element, or erase head, which may be positioned in a tape erase device between tape guide rollers to guide the tape medium over the tape erase element surface. The tape erase element has a housing including a pocket or inner space including a magnet to produce a magnetic flux to erase the tape medium content as the tape passes over an outer surface of the housing. The housing acts as a pole piece to transmit the magnet flux and helps form the magnetic bubble. Described embodiments provide an improved technique for forming a tape erase element having a housing and magnet disposed in the housing, where an outer or front surface of the housing has a gap along the length of the housing to produce a high gauss field bubble in a tape contact area or zone along the length of the gap of the outer surface of the tape erase element to erase content on the tape medium passing through the high gauss field bubble. Described embodiments further provide improved techniques for forming the tape erase element with a mono piece structure having a gap along a length of the outer surface dividing the tape erase element into two poles.

Figure 1:
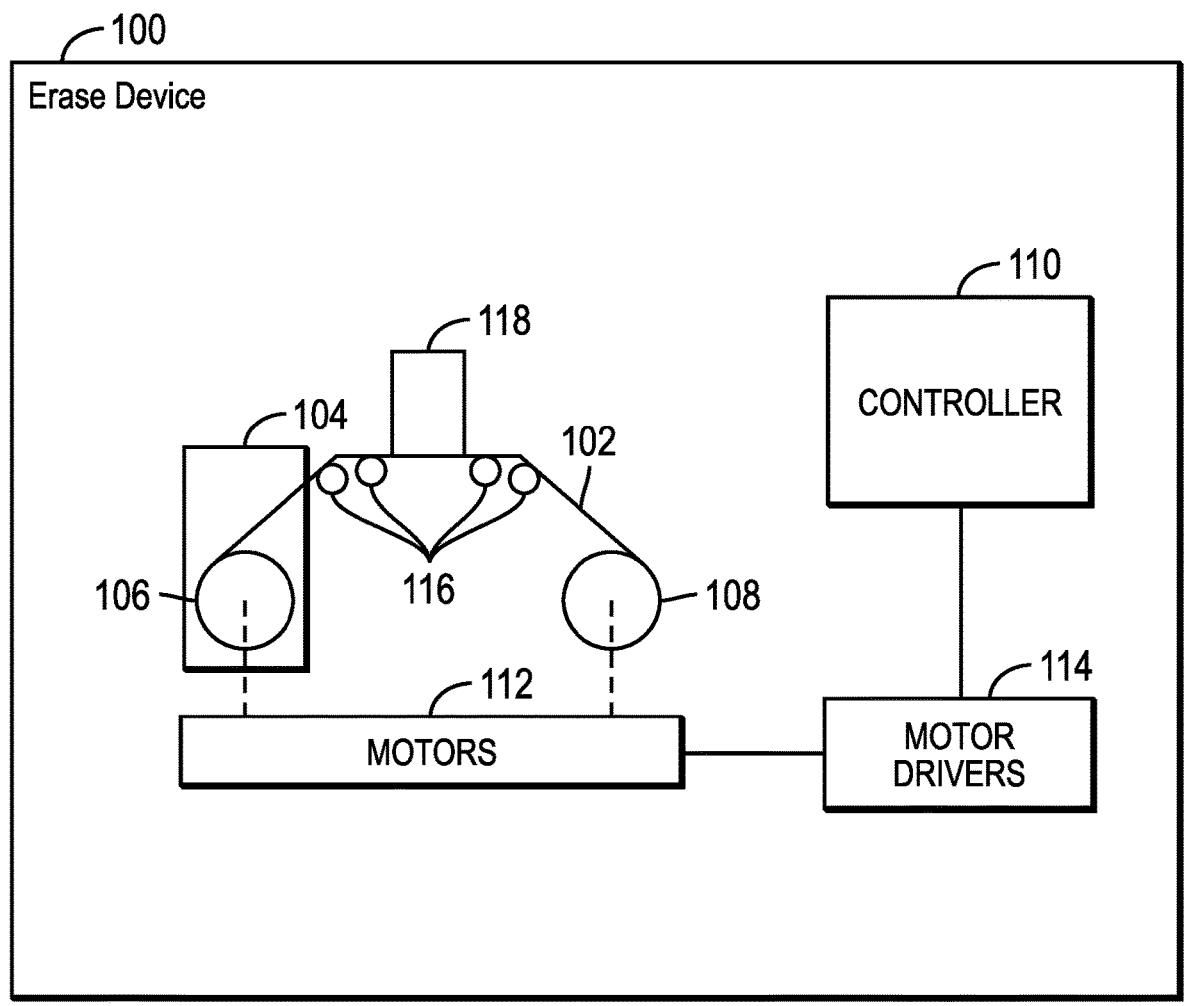
FIG. 1 illustrates an embodiment of an erase device in which embodiments are implemented.

FIG. 1 illustrates an embodiment of a tape erase device 100 to erase content of a magnetic tape medium 102 in a magnetic tape cartridge 104 by erasing the data and/or servo pattern on the tape medium 102. The magnetic tape cartridge 104 comprises a length of magnetic tape 102 wound on one or two reels 106, 108. By way of example, the magnetic tape cartridge 104 may comprise a single reel tape, such as adhering to the Linear Tape Open (LTO) format.

The tape erase device 100 may further include one or more controllers 110 to control the operation of motors 112 through motor drivers 114 to rotate the reels 106, 108 to move the tape medium 102 longitudinally across tape guide rollers 116 that guide the tape across a tape erase element 118 having a magnet to erase data and/or servo patterns on the tape medium 102.

The tape erase device 100 may comprise a standalone unit or comprise a part of a tape library or other subsystem to erase tapes in the tape library.

The tape cartridge 104 may be inserted in the tape erase device 100, and loaded by the tape drive 100 mechanisms. Tape guide rollers 116 guide the tape 102 across the tape erase element 118 to stabilize the positioning of the tape 102 with respect to the tape erase element 118 to ensure the tape through a tape contact zone of sufficient magnetic flux density generated by a magnet in the tape erase element 118. In one embodiment, the controller 110 may drive the entire length of the tape in one direction across the tape erase element 118 to erase data and/or server patterns and then drive the tape 102 in the reverse direction over the erasure element 118 to further erase any remnants of data remaining from the first pass over the tape erase element 118.

In one embodiment, the erase device 100 only includes the tape erase element 118 and does not include any read/write heads to read and write data. In an alternative embodiment, the tape erase element maybe included in a tape drive also having a read/write head to read and write data to the tape medium.

Figure 2:
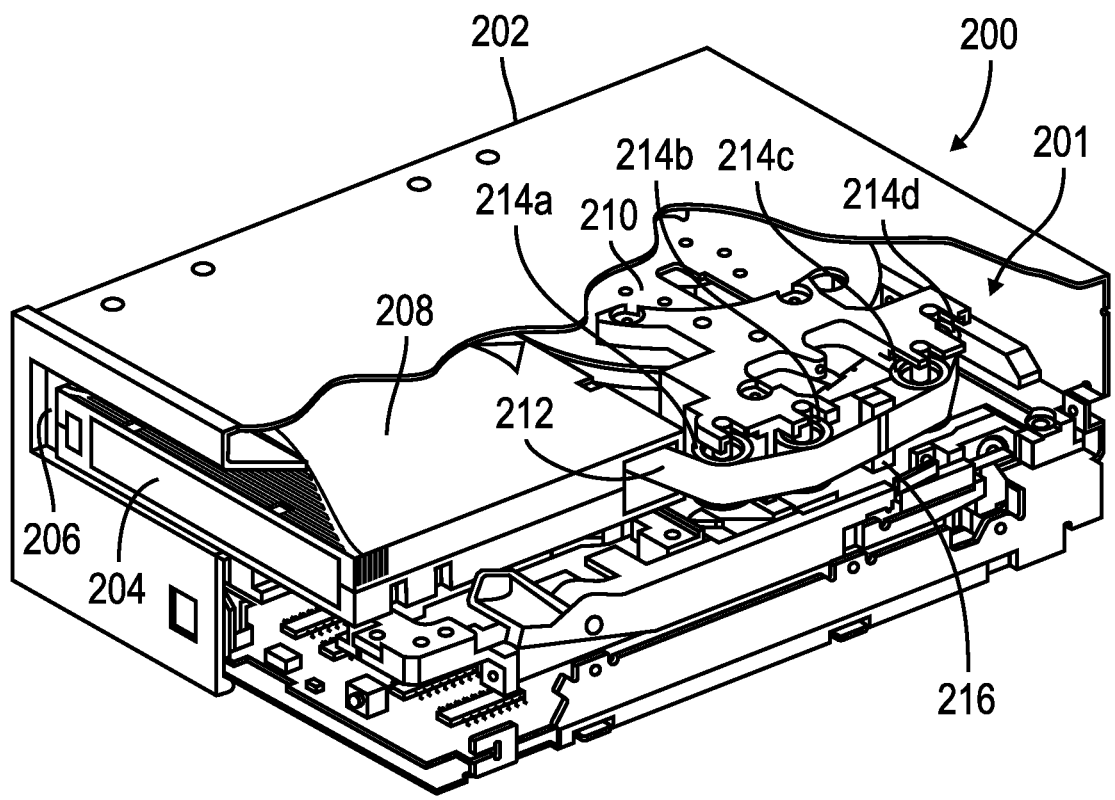
FIG. 2 illustrates an embodiment of a cut-away of an erase device housing to show internal components of the tape erase device

FIG. 2 illustrates an embodiment of a tape erase device 200 showing internal components within a cut away 201 of the tape erase device housing 202. The tape erase device 200 includes a housing 202, a tape cartridge 204 inserted into an opening 206 of the tape drive 200. The cartridge 204 includes a supply reel 208 having the tape medium that is accessed by the take-up reel 210 that feeds the tape medium 212 over tape guide rollers 214a, 214b, 214c, 214d to guide the tape 212 over a tape erase element 216 having a magnet to erase content in the tape medium 212.

Figure 3A:
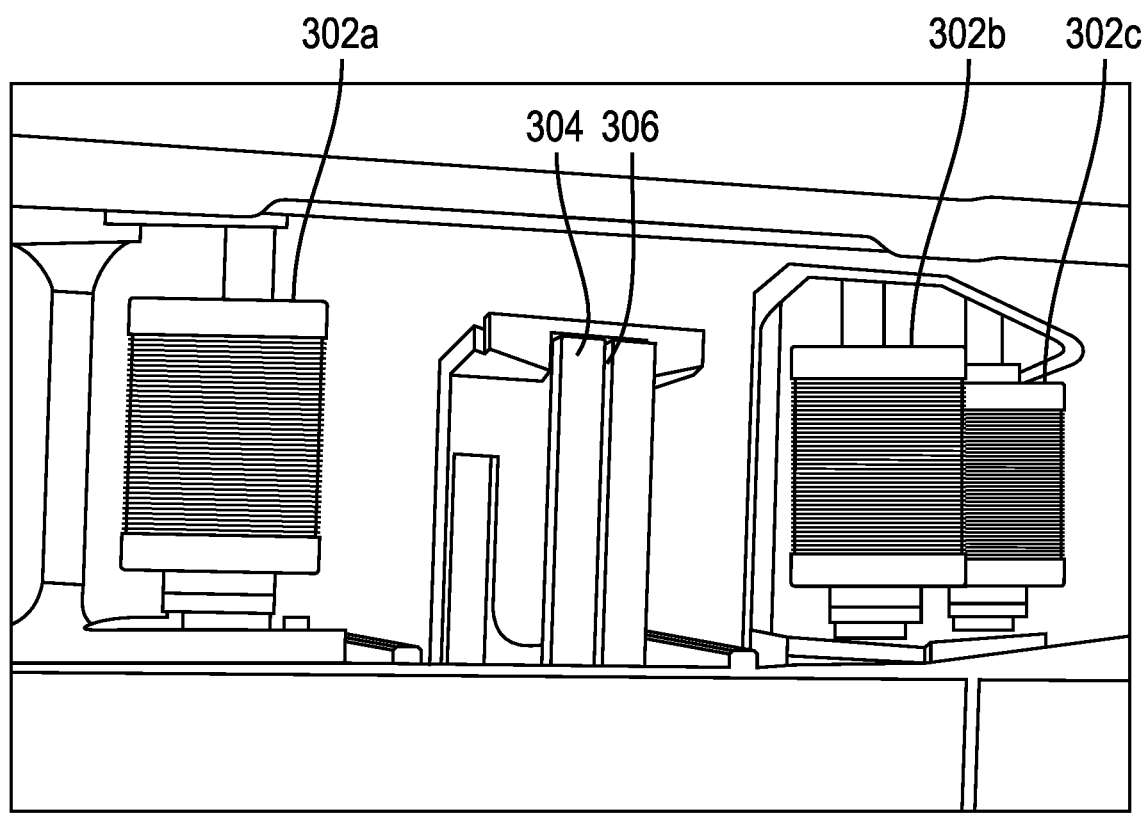
FIG. 3a illustrates an embodiment of a tape erase element in a tape medium path between tape guide rollers.

FIG. 3a illustrates an embodiment of further detail showing tape guide rollers 302a, 302b, and 302c and the tape erase element 304 positioned between the tape guide rollers 302a, 302b. The tape erase element 304 has a gap 306 and a magnet behind the gap 306 that generates magnetic flux to erase tape that the tape guide rollers 302a, 302b guide over the tape erase element 304.

Figure 3B:
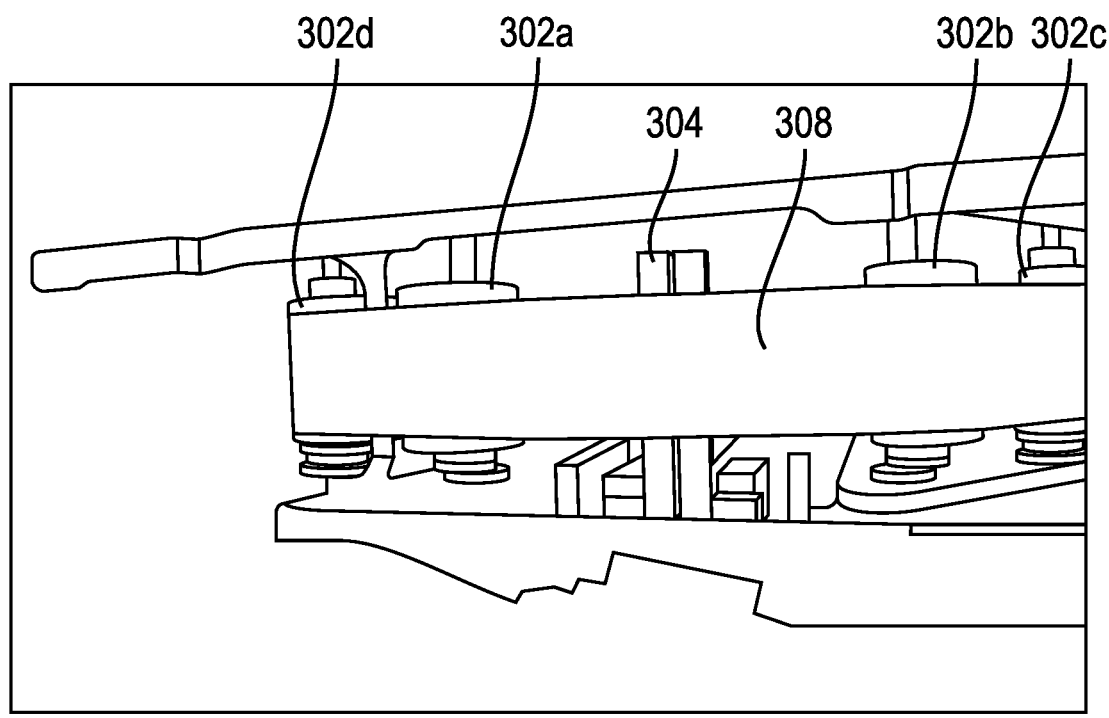
FIG. 3b illustrates the arrangement of FIG. 3a with the tape medium present.

FIG. 3b shows the embodiment of FIG. 3a with the tape medium 308 passing over the guide rollers 302a, 302b, 302c, and 302d and tape erase element 304 having the magnet behind the gap 306 to erase the tape medium 308 as it passes over the gap 306.

Figure 4A:
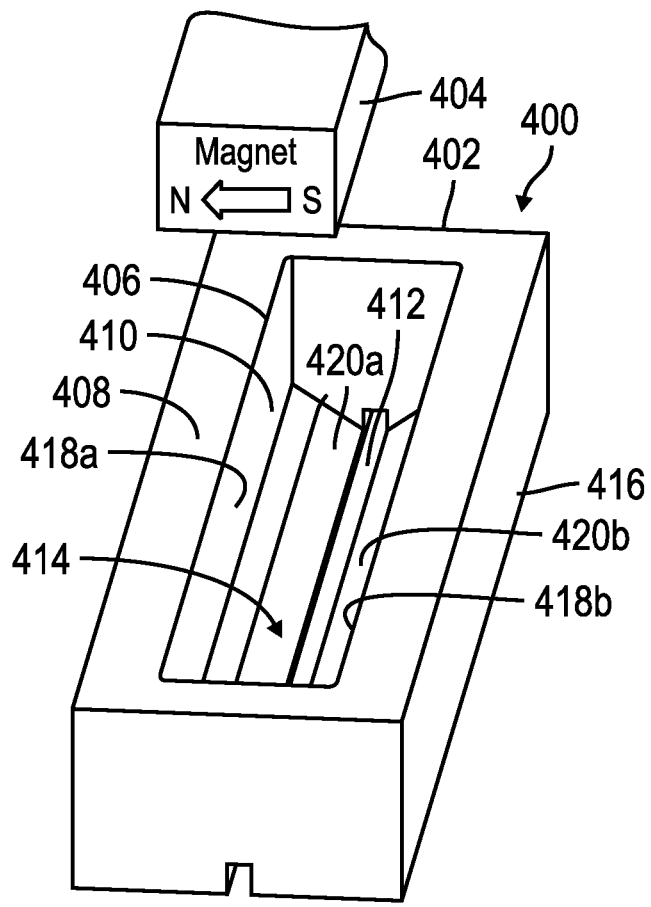
FIG. 4a illustrates a back side perspective view of an embodiment of a tape erase element housing and magnet.

FIG. 4a illustrates an embodiment of a perspective view of the back of the tape erase element 400. The tape erase element is referred to as having a back side, though which the magnet is inserted, and a front side over which the tape medium passes. However, different descriptions may apply to the orientation of the tape erase element. For instance, the back side may be referred to as the front side, and vice versa, and the side over which the tape medium passes and the opposite side may be referred to with different reference designators, such as sides, upper, lower, top, back, front, bottom, etc.

The tape erase element 400 has a housing 402 in which a magnet 404 is inserted. The north (N) and south (S) poles of magnet are shown with respect to the housing 402. An opening 406 is formed in a surface 408 of the housing 402, which opens into an inner space 410 of the housing 402 in which the magnet 404 is positioned. A gap 412 formed in an inner surface 414 of an upper side 416 of the housing extends from an outer surface (not shown) of the upper side 416 to the inner surface 414. The inner space 410 is defined by inner sidewalls 418a and 418b and sloped inner sidewalls 420a, 420b extending toward the gap 412.

Figure 4B:
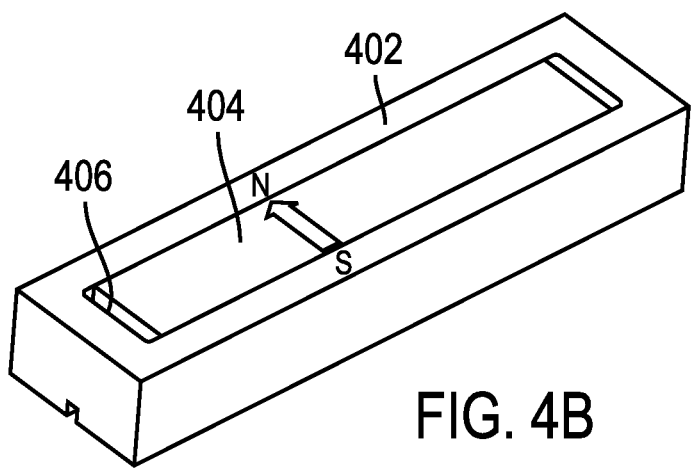
FIG. 4b illustrates a back side perspective view of the tape erase element of FIG. 4a with the magnet positioned within the housing.

FIG. 4b shows the magnet 404 positioned in the inner space 410, with sides in intimate contact with the magnet 404. The bottom surface of the magnet 404 is flush with the opening 406 of the housing 402.

Figure 4C:
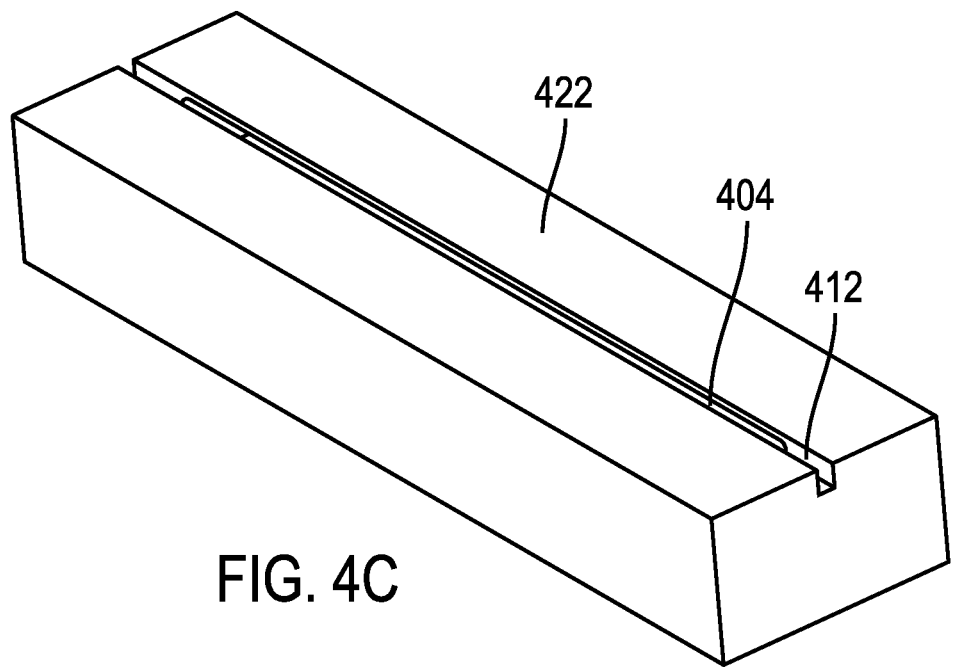
FIG. 4c illustrates a front side perspective view of the tape erase element of FIG. 4b showing a surface of the tape erase element over which the tape medium passes with the magnet positioned in the housing.

FIG. 4c shows a front side perspective view of the tape erase element 400 having an outer surface 422 with the gap 412 extending a length of the outer surface 422. The gap 412 exposes an upper surface of the magnet 404.

Figure 4D:
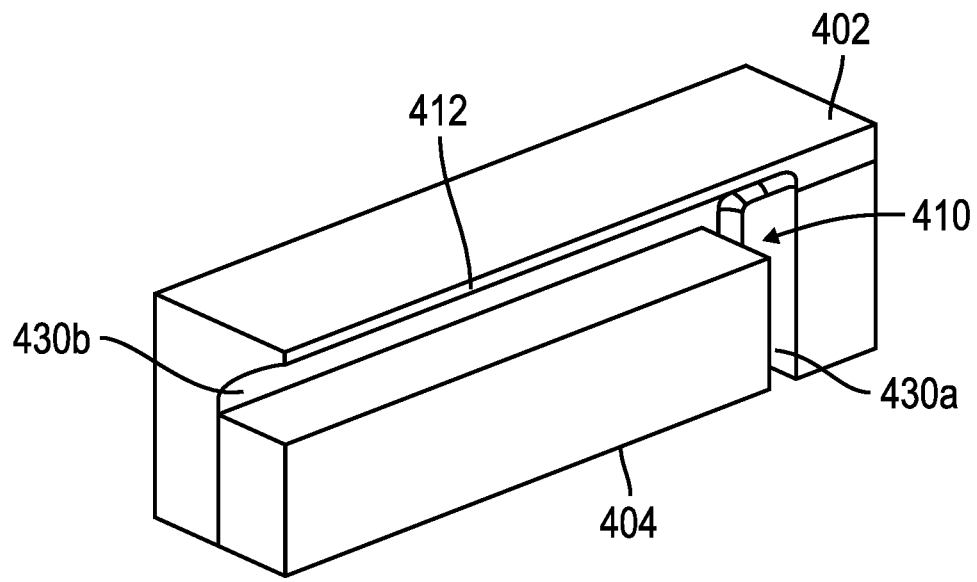
FIG. 4d illustrates a cross sectional front side perspective view of the tape erase taken along a length of the tape erase element of FIG. 4c.

FIG. 4d shows a cross sectional view of the tape erase element 400 taken along the length of the gap 412 shown in FIG. 4c. The magnet 404 is positioned in a lower portion space 430a of the inner space 410 and there is an open upper inner portion space 430b above the top surface of the magnet 404 when the magnet 404 is positioned in the housing 402. The upper portion of the space 430b has inner slanted side walls that extend toward opposite sides the gap 412. The side walls extending the length of the housing in the lower portion 430a are substantially straight, and not angled, to be in intimate contact with the surface of the magnet.

Figure 5A:
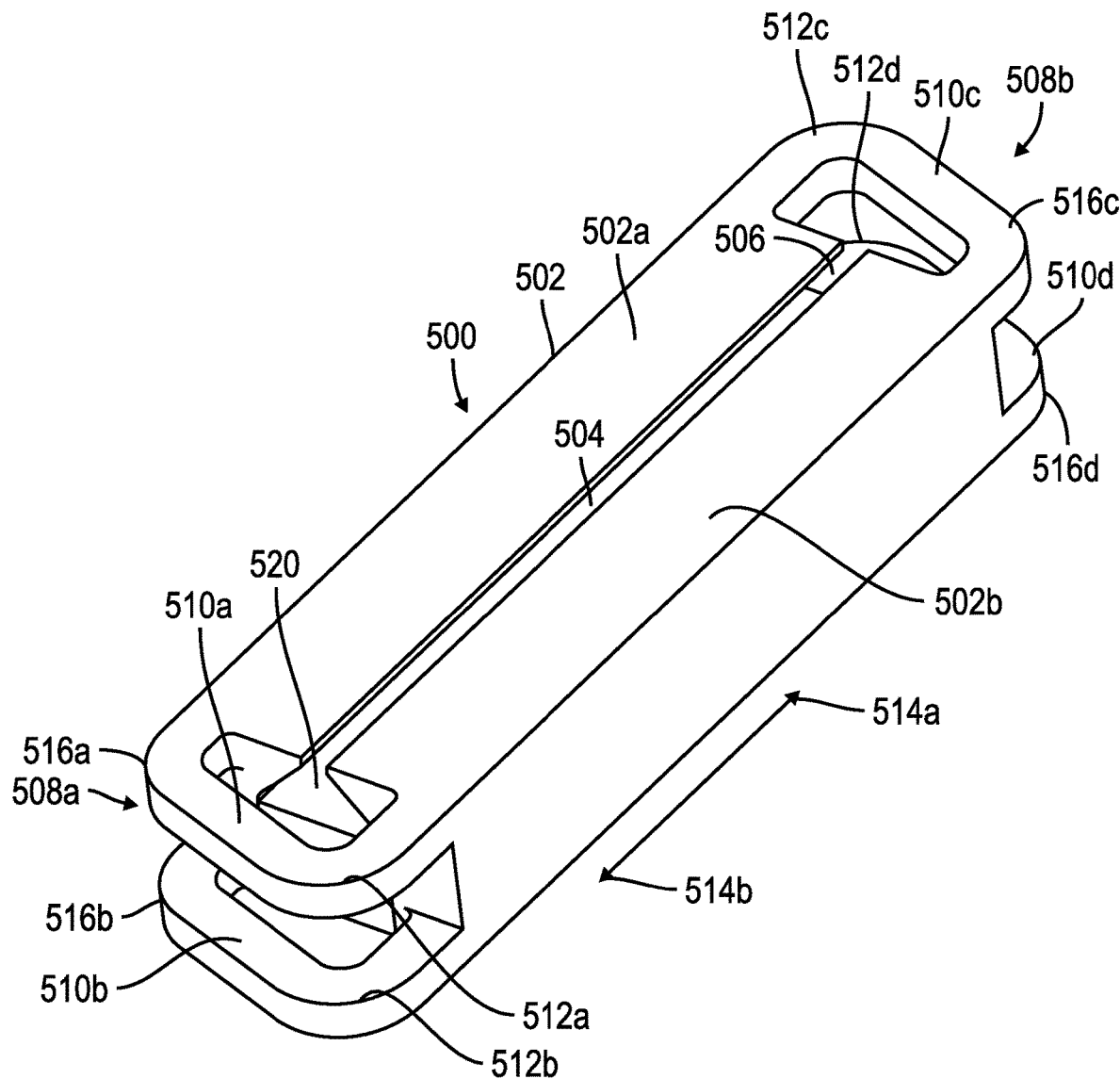
FIG. 5a illustrates a front side perspective view of an additional embodiment of a tape erase element with the magnet positioned in the housing.

FIG. 5a provides top perspective view of an additional embodiment of the tape erase element 500 having a housing 502, magnet 504, a gap 506, and two ends 508a, 508b each having two semi-flexible bridges 510a, 510b and 510c, 510d. The semi-flexible bridges 510a, 510b and 510c, 510d have corresponding extended portions 512a, 512b and 512c, 512d and corresponding non-extended portions 516a, 516b and 516c, 516d in an initial state The housing 502 is comprised of two sides 502a, 502b separated by the gap 506. The gap 506 may be increased by shifting the side 502b in direction 514a, e.g., to the right, and may be decreased by shifting the side 502a in direction 514b, e.g., to the left. During the shifting, the walls or edges of the gap 506 remain parallel along the length of the housing 502.

A machine tool (not shown) may be used to shift the second side 502b of the housing in the direction 514a by bending extended portions 512a, 512b in direction 514a to push in extended portions 512a, 512b and simultaneously bend extended portions on 512c, 512d on the other end 508b in opposite direction 514b to push-in, which pushes non-extended portions 516a, 516b, 516c, 516d outward. Shifting the second side 502b in direction 514a increases the width of the gap 506 uniformly along the length of the housing 502 and increases the inner space 520 in the housing 502 to accommodate larger magnets 504 that may not fit into the inner space 520 of the housing 502 in the initial state shown in FIG. 5a, 5b.

The machine tool (not shown) may be used to shift the second side 502b of the housing in the direction 514b by bending non-extended portions 516c, 516d in direction 514a to push out extended portions 512a, 512b and simultaneously bend non-extended portions 516a, 516b in opposite direction 514a to push-in, which pushes extended portions 512a, 512b, 512c, 512d outward. Shifting the second side 502b in direction 514b decreases the width of the gap 506 uniformly along the length of the housing 502 and decreases the inner space 520 in the housing 502 to accommodate relatively smaller magnets 504 to have walls of the inner space 520 in intimate contact with the smaller magnet 504. The gap 506 remains constant along the entire length of the housing 502 after adjustment, even though the width of the gap 506 is changed as result of adjustment.

Figure 5B:
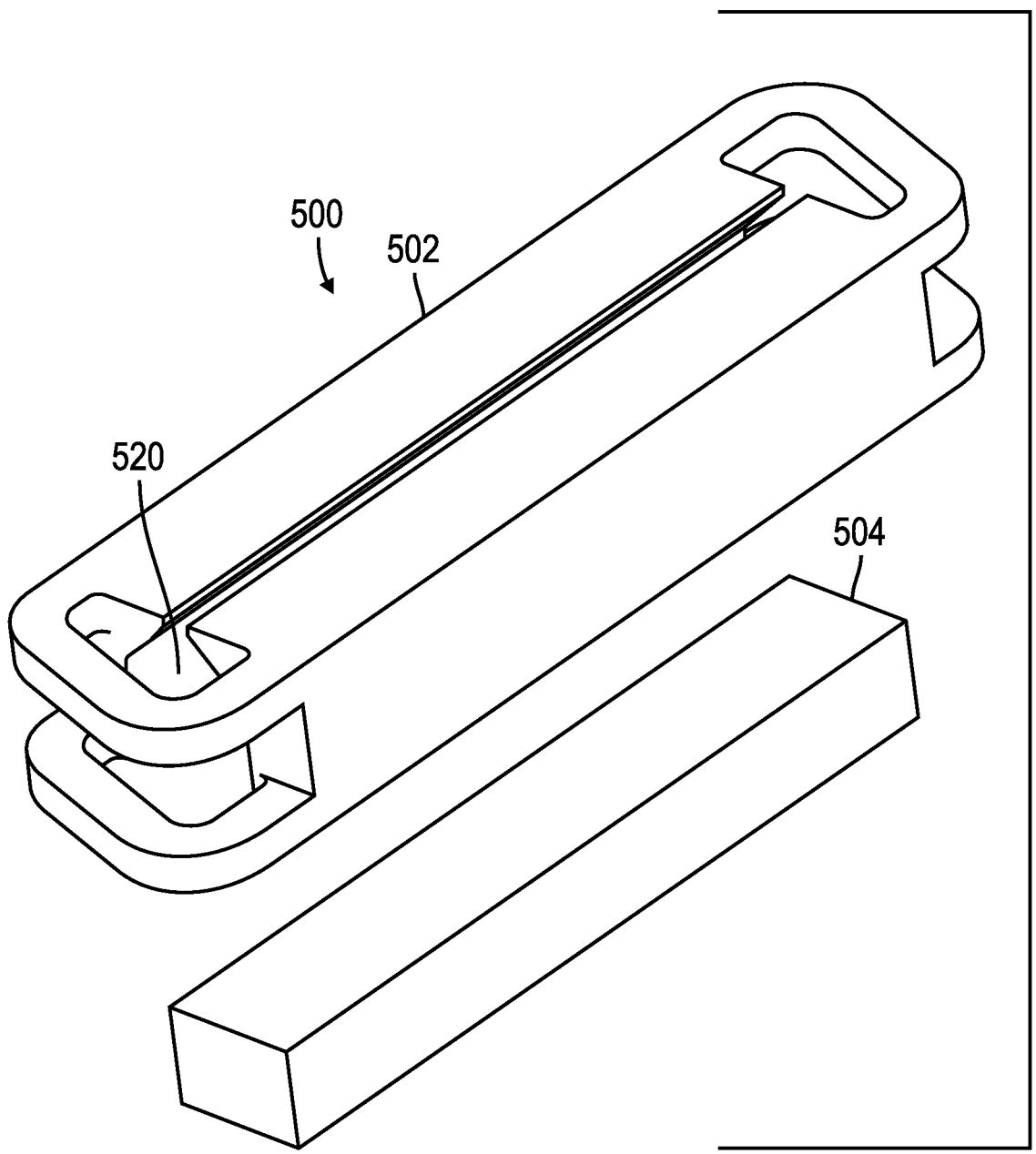
FIG. 5b illustrates a front side perspective view of the tape erase element embodiment of FIG. 5a with the magnet not positioned in the housing.

FIG. 5b provides an additional top perspective view of the taper erase element 500 of FIG. 5b showing the magnet 504 not yet positioned in the inner space 520 of the housing 502.

In FIGS. 4d and 5b the inner space 430b, 520 above the magnet 404, 504 has inner sidewalls in which the magnet fits. The inner space 430b, 520 substantially forms a trapezoidal prism, wherein the surface of the magnet 404, 504 comprises a lower base, an area of the gap 412, 506 comprises an upper base, and the first and the second inner slanted sidewalls of the inner space 430b, 420 comprise sides of the substantially trapezoidal prism.

Figure 6A:
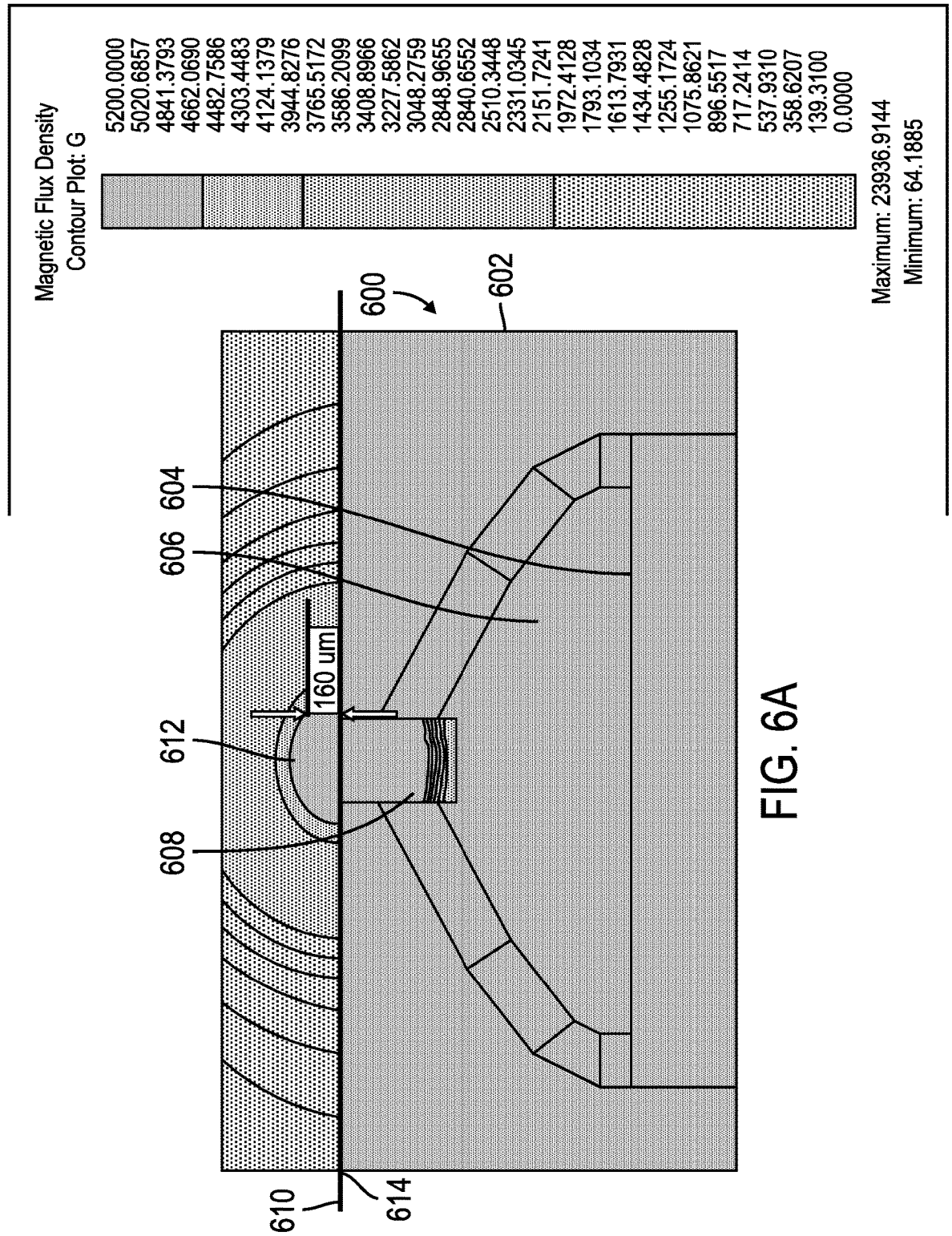
FIG. 6a illustrates a cross sectional side view taken along a width of the tape erase element of FIG. 4C with a contour map of the magnetic flux density produced by the tape erase element.

FIGS. 6a and 6b illustrate contour maps of the magnetic flux density produced within and about the tape erase element 600 by the magnet 604.

FIG. 6a is a front cross-sectional view taken along the width of the tape erase element 600. The tape erase element 600 has a housing 602, magnet 604, inner space 606 of the housing opening into a gap 608. The tape medium 610 passes through a gauss field bubble 612 of a highest magnet flux density produced by the magnet 604, such as the 5 KGauss contour. The gauss field bubble 612 overlaps an area of a tape contact zone on a surface 614 of the housing 602. Magnet information content on the tape, including data and servo patterns, are erased when passing through the gauss field bubble 612. The magnetic flux density decreases in intensity as distance increases from the contact surface 614.

FIG. 6b shows a cross-sectional view taken along the length of the center of the gap 608. As shown, the gas field bubble 612 extends along a length of the gap 608.

In further embodiments, there may be only one bridge on each end of the housing, not two on each side as shown in FIGS. 6a, 6b.

In certain embodiments of FIG. 6a, the height of the bubble 612 from the edge of the gap 608 is 170 micrometers (μm) and the bubble 612 height at its peak 200 μm. The height of bubble 612 may taper down within some 2 mm from the ends of the magnet 604, leaving 14.5 mm of a strong erase bubble across the length of the housing 602, which is sufficient to accommodate a tape width of approximately 12.5 mm. The bubble height at end of wear surface may be 150 μm.

In one embodiment, the outer surface of the housing 402, 502 length is 22.5 mm, the magnet 404, 504 length is 18.5 mm, and the region of the outer surface of the housing 402, 502 over which the tape passes, also referred to as the tape contact zone, is 13.5 mm, which comprises the high gas field bubble 612. This arrangement ensures the entire width of tape is exposed to the greatest area of magnetic flux intensity as the tape passes through the high gas field bubble 612 over the tape erase element 400, 500. These distances may change depending on a size of the gap, strength of the magnet, and size of the magnet.

In certain embodiments, the housing 402, 502 of the tape erase element may be formed of stainless steel type 430 and the magnet may comprise a Hitachi Neomax® 46CH magnet, 16.5 mm×2.75 mm. (NEOMAX is a trademark of Hitachi Metals, Ltd. worldwide).

In a further embodiment, the outer surface of the housing 402, 502 over which the tape passes may be angled 1-2 degrees from the gap to maintain the tape in contact with the erase element 400, 500.

Figure 7:
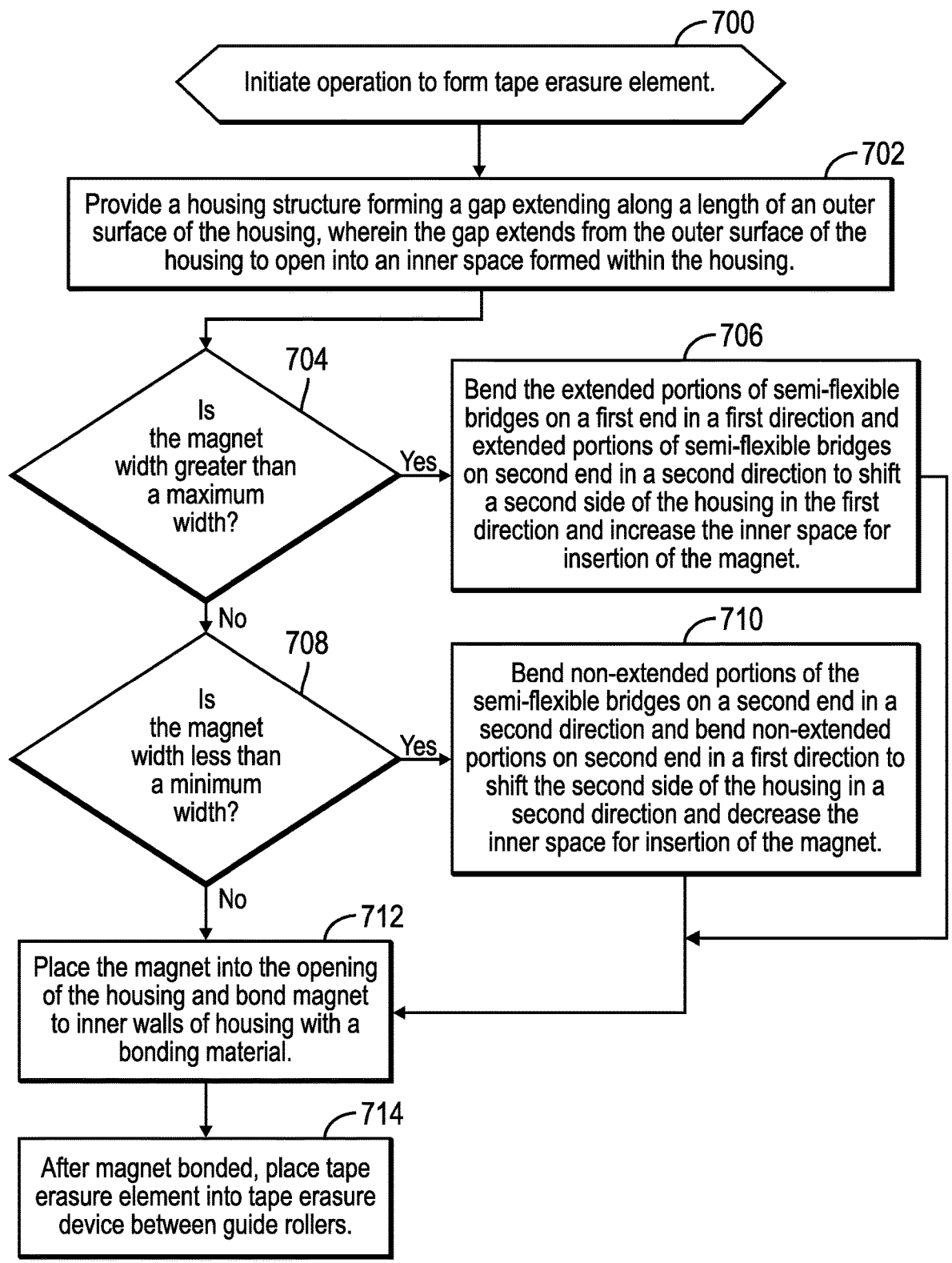
FIG. 7 illustrates an embodiment of operations to form the tape erase element.

FIG. 7 is an embodiment of operations performed by an automated machine process of a tape erase device manufacturing system or performed by a combination of human and machine actions. Upon initiating (at block 700) the operation to form the tape erase element, a housing structure 502 (FIG. 5) is provided forming a gap 506 extending along a length of an outer surface of the housing 502, wherein the gap extends from the outer surface of the housing to open into an inner space formed within the housing. If (at block 704) the magnet 504 is too large to be inserted into an inner space 520 of the housing, such as the magnet 504 width is greater than a maximum width, then a machine tool (not shown) may bend (at block 706) the extended portions 512a, 512b of the semi-flexible bridges 510a, 510b in a first direction 514a (FIG. 5a) and bend extended portions 512c, 512d on the second end 508b in an opposite direction 514b to shift the second side 502b in the first direction 514a to increase the inner space 520 for insertion of the magnet 504, thereby increasing the width of the adjustable gap 506.

If (at block 704) the magnet 504 is not too large to be inserted, i.e., the width is less than the maximum width, then a determination is made (at block 708) whether the magnet width is less than a minimum width, which would leave a sufficiently large gap between magnet 1504 body and inner walls of housing 502. If (at block 708) the magnet width is less than a minimum width, such as the magnet 504 is not in intimate contact with the inner walls of the housing 502, then the machine tool bends (at block 710) the non-extended portions 516c, 562d of the semi-flexible bridges 510c, 510d on the second end 508b in a second direction 414b and bends the non-extended portions 516a, 516b on the first end 508a in the first direction 514a to shift the second side 502b of the housing in a second direction 514b to reduce the inner space 520 for insertion of the magnet 504. The gap 506 remains at constant width across the length of the housing 502 after the adjustment to maintain the high gas field bubble 612 uniform across the length of the housing 502.

For instance, if the width of the magnet 504 is expected to be 3-4 mm, then if the magnet 504 is greater than 4 mm in width (the maximum width), shift in direction 514a to increase the inner space 520. Otherwise, if the magnet 504 is less than 3 mm in width (minimum width), then shift in direction 514b to decrease the inner space 520 so the magnet will have intimate contact with the inner surface of the housing 502.

From block 706, 710 or the no branch of block 708, the magnet 504 is placed (at block 712) into the opening of the housing and the magnet 504 may be bonded to the inner walls of the housing with a bonding material, such as an instant adhesive, e.g., Loctite 406. After the magnet 504 is bonded to the inner walls of the housing, the tape erasure element 216 (FIG. 2), 304 (FIG. 3) may be placed (at block 714) into a tape erasure device 200 (FIG. 2) between the guide rollers 214a, 214b, 214c, 214d, also as shown in FIGS. 3A, 3B as 302a, 302b, 302c, 302d.d The present invention may be a tape erase element, a tape erase device having the element, and a method for forming the tape erase element.

In the described embodiment, variables i, n, etc., when used with different elements may denote a same or different instance of that element.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by a machine system to manufacture a tape erase element and tape erase device including the tape erase element.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape erase element deployed in a tape erase device having tape guide rollers to guide a tape medium across the tape erase device, comprising:
   a housing forming a gap extending along a length of an outer surface of the housing, wherein the gap extends from the outer surface of the housing to open into an inner space formed within the housing; and
   a magnet positioned within the inner space of the housing and having a surface extending across the gap, wherein the magnet produces a magnetic flux that extends through a tape contact zone extending across a portion of the outer surface of the housing and the gap to erase content on the tape medium as the tape guide rollers guide the tape medium across the housing through the tape contact zone.

2. The tape erase element of claim 1, wherein the housing comprises a rectangular shape and the length of the outer surface along which the gap extends is longer than a width of the housing.

3. The tape erase element of claim 1, wherein the outer surface is on a first side of the housing, further comprising:
   a second side of the housing having an opening to the inner space of the housing and adapted to receive the magnet, wherein the magnet fits within the inner space housing and is flush with the opening.

4. The tape erase element of claim 1, wherein the inner space of the housing has a first portion space in which the magnet is positioned and a second portion space between a surface of the magnet positioned in the first portion space and an inner surface of the housing opposite the outer surface, wherein the gap extends through the outer surface and the inner surface, wherein a region of highest magnetic density extends along a portion of the length of the gap.

5. The tape erase element of claim 4, wherein the second portion space is further formed between:
   a first inner slanted sidewall extending from a first edge of the magnet to a first side of the gap; and
   a second inner slanted sidewall extending from a second edge of the magnet opposite the first edge to a second side of the gap opposite the first side of the gap, wherein the second portion space forms a substantially trapezoidal prism, wherein the surface of the magnet comprises a lower base and an area of the gap comprises an upper base of the substantially trapezoidal prism, and the first and the second inner slanted sidewalls comprise sides of the substantially trapezoidal prism.

6. The tape erase element of claim 1, wherein a magnet length is less than a gap length, wherein the magnet length is greater than the tape contact zone of the outer surface over which the tape medium passes.

7. The tape erase element of claim 1, wherein the housing comprises a mono structure with the gap formed therein.

8. The tape erase element of claim 1, further comprising:
   a first end of the housing forming a first semi-flexible bridge and a first adjustable gap; and
   a second end of the housing forming a second semi-flexible bridge and a second adjustable gap, wherein the first end and the second end are slanted at angles.

9. The tape erase element of claim 8, wherein the first and the second semi-flexible bridges are adapted to bend in a first direction to decrease a volume of the inner space to form a tighter fit between the magnet and an inner surface of the housing, and wherein the first and second semi-flexible bridges are further adapted to bend in a second direction to increase the inner space for insertion of the magnet.

10. A tape device for erasing data on a tape medium mounted in the tape device, comprising:
    a tape erase element, comprising:
       a housing forming a gap extending along a length of an outer surface of the housing, wherein the gap extends from the outer surface of the housing to open into an inner space formed within the housing; and
       a magnet positioned within the inner space of the housing and having a surface extending across the gap, wherein the magnet produces a magnetic flux that extends through a tape contact zone extending across a portion of the outer surface of the housing and the gap to erase content on the tape medium; and
    tape guide rollers, wherein the tape erase element is positioned between at least two of the tape guide rollers, wherein the tape guide rollers are adapted to guide the tape medium across the tape contact zone where the magnetic flux erases content on the tape medium.

11. The tape device of claim 10, wherein the inner space of the housing has a first portion space in which the magnet is positioned and a second portion space between a surface of the magnet positioned in the first portion space and an inner surface of the housing opposite the outer surface, wherein the gap extends through the outer surface and the inner surface, wherein a region of highest magnetic density extends along a portion of the length of the gap.

12. The tape device of claim 11, wherein the second portion space is further formed between:

a first inner slanted sidewall extending from a first edge of the magnet to a first side of the gap; and a second inner slanted sidewall extending from a second edge of the magnet opposite the first edge to a second side of the gap opposite the first side of the gap, wherein the second portion space forms a substantially trapezoidal prism, wherein the surface of the magnet comprises a lower base and an area of the gap comprises an upper base of the substantially trapezoidal prism, and the first and the second inner slanted sidewalls comprise sides of the substantially trapezoidal prism.

13. The tape device of claim 10, wherein a magnet length is less than a gap length, wherein the magnet length is greater than the tape contact zone of the outer surface over which the tape medium passes.

14. The tape device of claim 10, wherein the housing comprises a mono structure with the gap formed therein.

15. The tape device of claim 10, further comprising:
a first end of the housing forming a first semi-flexible bridge and a first adjustable gap; and
a second end of the housing forming a second semi-flexible bridge and a second adjustable gap, wherein the first end and the second end are slanted at angles.

16. A method for forming a tape erase element deployed in a tape device having tape guide rollers to guide a tape medium across the tape erase device, comprising:
providing a housing forming a gap extending along a length of an outer surface of the housing, wherein the gap extends from the outer surface of the housing to open into an inner space formed within the housing; and
positioning a magnet within the inner space of the housing and having a surface extending across the gap, wherein the magnet is adapted to produce a magnetic flux that extends through a tape contact zone extending across a portion of the outer surface of the housing and the gap to erase content on the tape medium moves through the tape contact zone.

17. The method of claim 16, wherein a first end of the housing forms a first semi-flexible bridge and a second end of the housing forms a second semi-flexible bridge, wherein the housing is formed of a first side and a second side separated by the gap:
determining whether a magnet width of the magnet exceeds a maximum width; and
in response to determining that the magnet width exceeds the maximum width, bending the first semi-flexible bridge in a first direction to shift the second side in the first direction to increase a volume of the inner space for insertion of the magnet.

18. The method of claim 17, further comprising:
determining whether the magnet width is less than a minimum width; and
in response to determining that the magnet width is less than the minimum width, bending the second semi-flexible bridge in a second direction to shift the second side in the second direction to decrease the inner space to form a tighter fit between the magnet and an inner surface of the housing.

19. The method of claim 18, wherein shifting the second side in the first direction results in increasing a width of the gap, wherein the shifting the second side in the second direction results in decreasing the width of the gap.

20. The method of claim 16, further comprising:
inserting the tape erase element into a tape erase device in a tape medium path between tape guide rollers, wherein the tape guide rollers guide are adapted to guide the tape medium along the tape medium path in contact with the tape erase element.

* * * * *